United States Patent

[11] 3,568,056

| [72] | Inventor | Eugene R. Keeler<br>Suffern, N.Y. |
|---|---|---|
| [21] | Appl. No. | 767,654 |
| [22] | Filed | Oct. 15, 1968 |
| [45] | Patented | Mar. 2, 1971 |
| [73] | Assignee | Timex Corporation<br>Waterbury, Conn. |

[54] PHASE MEASUREMENT INSTRUMENT
4 Claims, 3 Drawing Figs.

| [52] | U.S. Cl. | 324/83, 328/55 |
|---|---|---|
| [51] | Int. Cl. | G01r 25/00 |
| [50] | Field of Search | 324/83 (A), 83 (D); 328/55, 155 |

[56] References Cited
UNITED STATES PATENTS

| 2,402,916 | 6/1946 | Schroeder | 328/55 |
| 2,562,912 | 8/1951 | Hawley | 324/83(A)UX |
| 2,963,648 | 12/1960 | Baskin et al. | 324/83(A) |

*Primary Examiner*—Alfred E. Smith
*Attorney*—Richard A. Joel

ABSTRACT: An instrument to measure the phase components of a signal is accurate for signals within a frequency range without adjustment. The instrument includes a squaring network and an adjustable duty cycle generator network.

INVENTOR.
EUGENE R. KEELER

PHASE MEASUREMENT INSTRUMENT

The present invention relates to electrical testing equipment and more particularly to an instrument which measures the phase components of a signal.

The type of electrical signal which is to be tested by the instrument of the present invention is in the form of an electrical voltage wave having some repetition rate, i.e., its frequency. The signal is compared to a reference signal to measure its in-phase or quadrature voltage or other phase relationship.

The measurement of phase is used as a testing procedure to determine the accuracy of various types of devices. For example, in the testing of gyroscopes, it is sometimes important that the signal produced by certain windings of its pickoff be exactly 90° (at quadrature) from a reference signal.

It is important that the phase angle measurement instrument be accurate, for example, to ±0.2 percent over the entire range of frequencies within the capability of the instrument. If the instrument is less accurate, and particularly if it is inaccurate in a random or nonlinear manner, its measurements may be less useful or worthless.

Previous measuring instruments of this type suffered two main disadvantages. First, they were not reliably accurate or uniformly accurate in their measurements over the frequency band to which they responded. Secondly, they were limited in their frequency response. In one type of previous instrument, it was necessary to accurately dial the frequency of the signal which was to be tested. A small difference, for example, from 400 c.p.s. to 401 c.p.s., between the actual response and the dial settings on two instruments, would result in the measurements indicated by the two instruments being different, although actually the phase angle and frequency were the same. Another type of phase sensitive instrument has sought to avoid some of the limitations as to frequency by using a set of special passive filters. That instrument, however, requires that the operator switch to the correct frequency band. In addition, the special filters of that type of instrument may be relatively expensive.

It is, accordingly, the objective of the present invention to provide a phase sensitive instrument which is reliably accurate, which responds to signals over a broad frequency range without the necessity for any setting by an operator, and which is relatively not expensive.

In accordance with the present invention, a measuring instrument is provided in which a series of subcircuits are electrically connected together. The input reference signal is first acted upon by a squaring subcircuit which produces two complementary out-of-phase square waves at the same frequency as the input reference signal. The square waves are both transmitted to a first duty cycle generator network which may be adjusted in its duty cycle by external means, but which holds its predetermined duty cycle constant over a relatively wide range of frequencies. The first duty cycle generator network is connected with a first flip-flop circuit. These subcircuits produce a signal with a normal 90° phase shift relative to the reference input signal at any frequency within the design capabilities of the instrument.

A further normal phase shift of 90° may be obtained by utilizing a second duty cycle generator network connected in tandem with a second flip-flop subcircuit.

A switch connects the normal 90° phase shift flip-flop, or alternatively the normal 180° flip-flop, to an amplifier. The amplifier drives a demodulator. The demodulator utilizes the reference signal as its input and produces the phase sensitive signal as its output.

The duty cycle generator networks operate on an adjustable duty cycle which may be changed by turning a dial. The duty cycle generator networks include a monostable multivibrator whose pulse width is determined by an external voltage signal. A feedback loop, which is influenced by the dial setting, forces the "ON" time of the multivibrator to be a fixed percentage of the period of the input signal. The feedback loop also includes an integrator. The wave form produced by the integrator is of a generally sawtooth shape, in which the front and back slopes are not necessarily of the same slope. A change of frequency would result in a change in the amplitude of the sawtooth wave procured by the integrator. However, the feedback loop to the multivibrator is sensitive only to the ratio of the times of the positive and negative excursions of the wave, and not to the amplitude. Consequently, the feedback loop is not sensitive to frequency. The instrument may be used to measure the in-phase voltages or quadrature voltages of transducers. The instrument may also include a phase sensitive null meter.

Other objectives of the present invention will be apparent from the detailed description of the invention set forth below, taken in conjunction with the drawings. In the drawings.

Figure 1:
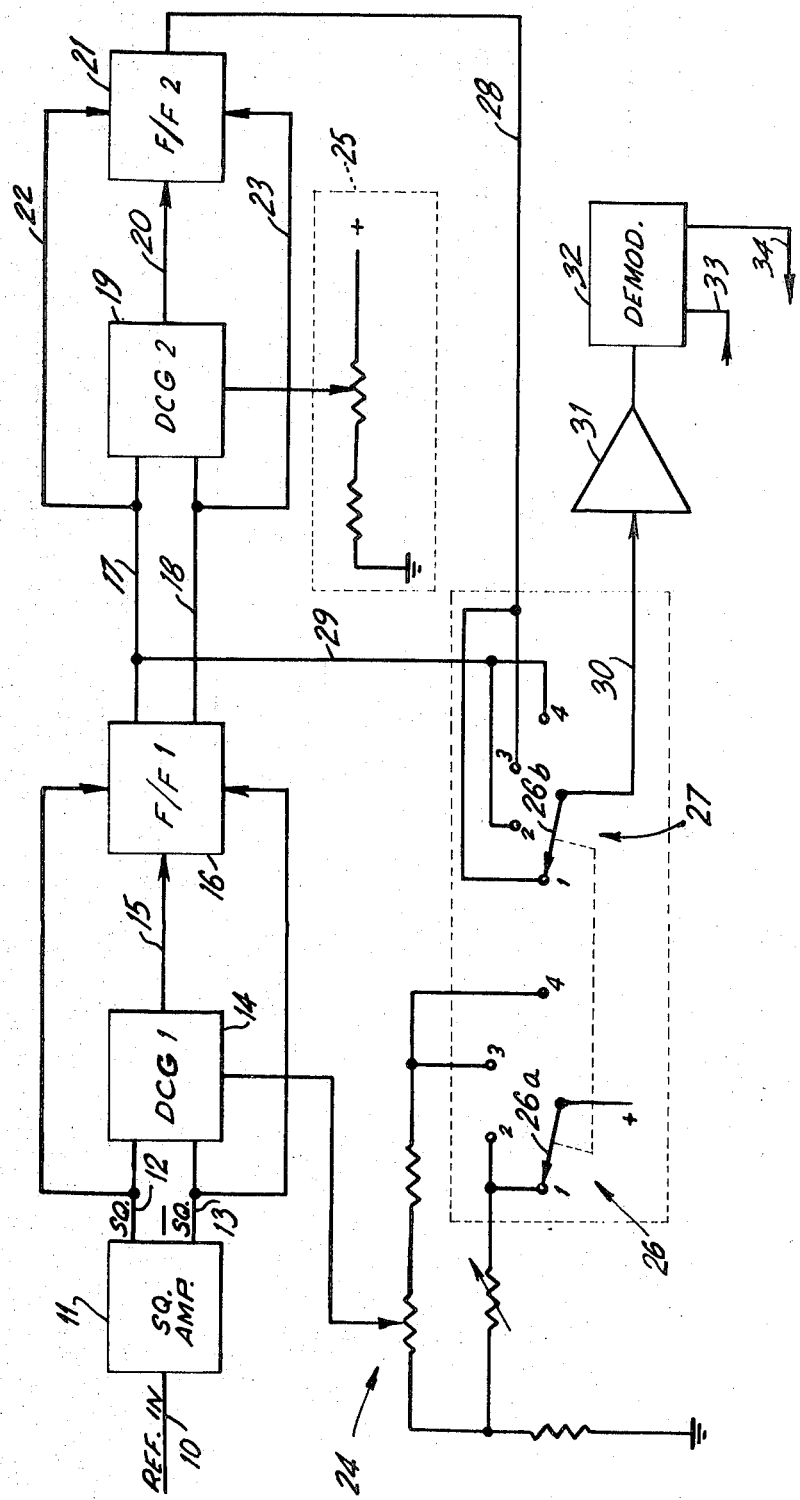
FIG. 1 is a block schematic diagram of the system of the instrument of the present invention.

The present invention contemplates that a reference signal of a continuous or discontinuous electrical wave form be presented to the system. For example, the electrical reference signal may be obtained by plugging a jack or a connection wire to the instrument, the other end of the wire being connected to a device which is being tested, for example, a gyroscope pick off. In FIG. 1, the reference signal on line 10, which may be, for example, a sine wave or a square wave, is presented to a high-gain squaring amplifier 11. The reference signal may be, for example, 6—28 volts peak-to-peak and of a frequency of 50—5000 Hz. The squaring amplifier produces two signals on lines 12 and 13, respectively. The signals on lines 12 and 13 are complementary to each other, that is, they are 180° out-of-phase. These signals are square waves which are of the same frequency as the frequency of the reference signal with the zero crossings coinciding with those of the input signal. The lines 12 and 13 are connected to a first 90° duty cycle generator network 14. The duty cycle generator network is connected by line 15 to a first flip-flop subcircuit 16. In addition, the lines 12 and 13 are also connected to the first flip-flop circuit 16.

The normal state of the flip-flop 16 in one of its two steady states is determined by a pulse from the duty cycle generator network 14. However, if there are some inadvertent errors in the phase shift network 14, so that a pulse is not produced at the correct time, then the synchronization of the flip-flop subcircuit 16 is obtained from the original square waves on lines 12 and 13. In the absence of such synchronization, it is conceivable that the flip-flop subcircuit 16 could become 180° out-of-phase.

The first flip-flop subcircuit 16 changes its state every time a pulse arrives from the pulse shift network by means of line 15. The lines 17 and 18 connect the first flip-flop subcircuit 16 to the second duty cycle generator network 19. The second duty cycle generator network 19 is of the same construction as the first duty cycle generator network 14. The pulses from the second duty cycle generator network 19 are transmitted by line 20 to the second flip-flop subcircuit 21. The second flip-flop subcircuit 21 has the same circuit configuration as the first flip-flop 16. The lines 22 and 23 connect the output lines 17 and 18, respectively, of the first flip-flop 16 directly to the second flip-flop 21 to provide synchronization in the event that the pulse train from the pulse shift network 19 is interrupted.

Duty cycle setting arrangements 24 and 25 are provided for each of the respective duty cycle generator networks 14 and 19. The operation of the duty cycle networks will be described in detail in connection with the schematic diagram of FIG. 2. The duty cycle generator network 14 is connected to a first set of switch contacts 26 having four switch positions. The movable contact arm 26a is ganged to the movable contact arm 26b of a second set of switch contacts 27. The second set of switch contacts 27 also has four positions. In switch 27 the positions 1 and 3 are connected to the output line 28 of the second flip-flop circuit 21. The switch positions 2 and 4 of switch 27 are connected to the output line 29 of the first flip-flop subcircuit 16. The switch positions 2 and 4 provide a normal 90° phase shift relative to the reference signal. The output arm 30 of switch 27 is connected to an amplifier 31 which is connected to demodulator 32. The demodulator has an input terminal 33 for the reference signal and an output terminal 34 which provides the phase sensitive signal.

Figure 2:
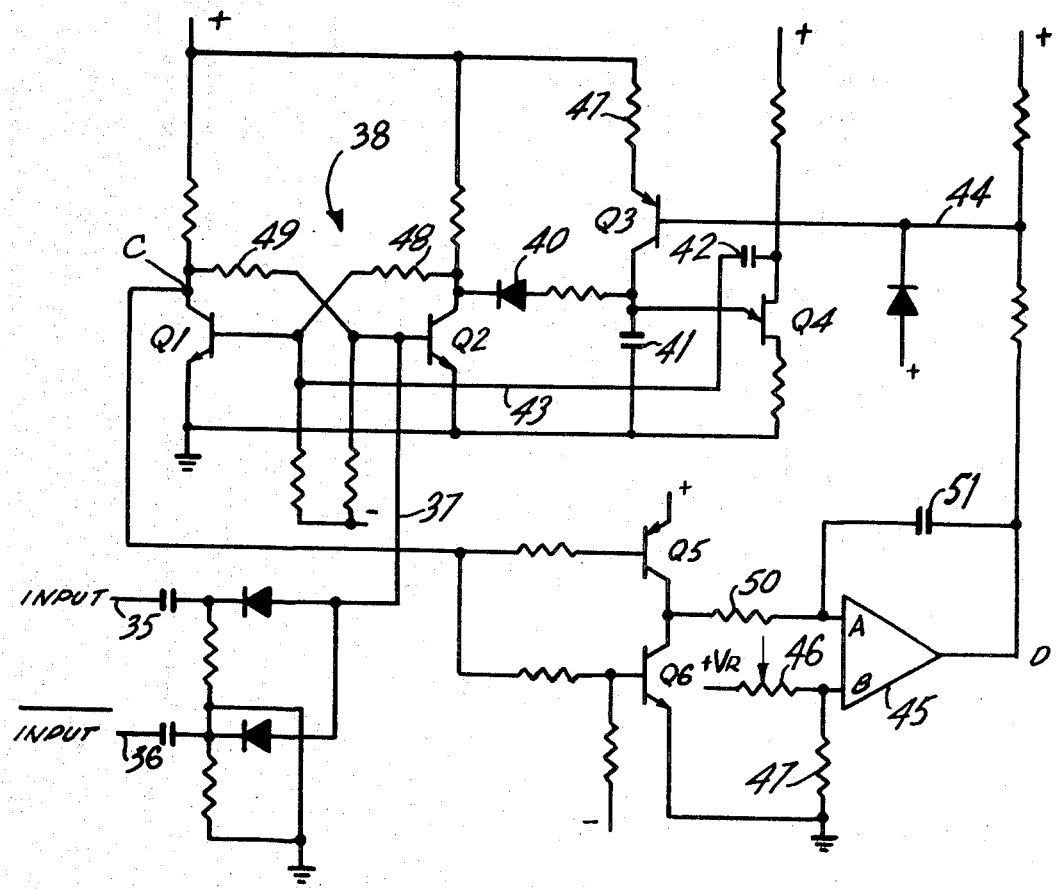
FIG. 2 is a schematic diagram of the duty cycle generator network.

The duty cycle generator networks 14 and 19 are shown in FIG. 2. The duty cycle generator network shown in FIG. 2 is a constant duty cycle generator which is adjustable in the duration of its duty cycle. It is a monostable multivibrator whose "ON" time is controlled by a closed loop feedback system. The inputs to the circuit are lines 35 and 36, which correspond to lines 12, 13 and 17, 18 of FIG. 1. The inputs are square waves on lines 35 and its complementary 180° out-of-phase square waves on line 36. The input signals are transmitted by line 37 to the input of a monostable multivibrator 38. The monostable multivibrator 38 may be of any of the standard types of this circuit. The illustrated multivibrator 38 utilizes two NPN transistors Q1 and Q2. The base of Q2 is connected, through resistor 49, to the collector of Q1. A zero crossing of the input signal applies a negative going spike to the base of transistor Q2. This causes transistor Q2 to cut off and allows capacitor 41 to charge up through resistor 47 and transistor Q3. Transistor Q2, in turning off, forces transistor Q1 to conduct.

The "ON" state of transistor Q1 permits transistor Q5 to conduct. During the time when transistor Q2 is cut off, diode 40 is reverse biased preventing any undesired current from the multivibrator from charging the capacitor 41 other than its controlled charging current. The charging of capacitor 41 causes the unijunction transistor Q4 to conduct, resetting the multivibrator (transistors Q1 and Q2) through capacitor 42.

When the point C (the collector of Q1) is negative, transistor Q5 is conducting causing the output D of operational amplifier 45 to go negative. This action decreases the voltage at the base of transistor Q3. The amplifier 45 acts as an integrator producing an output at point D in response to the ratios of the "ON" times of transistors Q5 and Q6. As point D becomes more negative, the current through resistor 47 increases, causing the capacitor 41 to charge more rapidly, i.e., the "ON" time is shorter. If point C is positive, then transistor Q5 is cut off, transistor Q6 is on and a positive ramp is produced.

The basic idea in the duty cycle generator network is that changes in frequency should not have any effect on the output. This is accomplished by providing a closed loop system in which the output has a sawtooth wave. The sawtooth wave has a front ramp (leading portion) rising to a peak and a back ramp (following portion) descending from that peak. When the frequency changes, the circuit is such that the time constants may change, altering the frequency of the output sawtooth waves, but the slopes and shape of the wave is the same. The amplitude of the wave is changed, however, by adjusting the duty cycle of the circuit, i.e., to select the phase angle.

The front and back slopes of the wave will not usually be the same; they may vary in their angle, for example, in the ratio of 3 to 1. The slopes will stay the same, i.e., maintain the same ratio in the relationship of the front to the back slope, even though the frequency changes.

The duty cycle is varied, to change the phase angle, by varying the adjustable resistor 46. The resistor 47 may also be made adjustable for that purpose. The capacitor 51 discharges, through transistor Q6, in the period between $T_1$, where T is the reset time of the multivibrator, and the next crossing of the zero axis of the input voltage waveform. The voltages of amplifier 45 are the same at points A and B. The following formulas show that the duty cycle is not affected by the frequency:

(1) $$\frac{V_R - V_A}{R_{46}}(T_1) = \frac{V_A}{R_{46}}\left(\frac{1}{f_{in}} - T_1\right)$$

(2) $$V_R T_1 - V_A T_1 = \frac{V_A}{f_{in}} - V_A T_1$$

(3) $$V_R T_1 = \frac{V_A}{f_{in}} = \frac{V_B}{f_{in}}$$

(4) $$T_1 f_{in} = \frac{V_B}{V_R} = \text{Duty cycle}$$

The duty cycle does not change with frequency and is controlled by varying $V_B$, for example, by resistor 46.

$V_A$ is the voltage at the inverting input of amplifier 45, $V_B$ is the control voltage.

Figure 3:
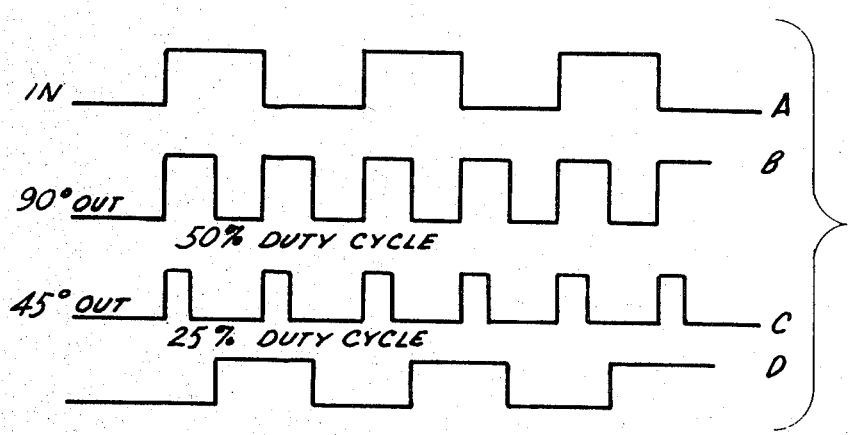
FIG. 3 is a series of wave forms produced under various conditions within the duty cycle generator network shown in FIG. 2.

As shown in FIG. 3, the input wave A is a square wave. The duty cycle generator is triggered by every zero crossing of the reference voltage. The output wave B, of the duty cycle generator at a 50 percent duty, is coupled to a flip-flop to produce a normal 90° out-of-phase output. The output of the flip-flop D is triggered by every negative going edge of the 50 percent duty cycle wave B so that the wave D is normally 90° out-of-phase relative to the input. The flip-flop produces a square wave output. The output wave C of the phase shift network at a 25 percent duty cycle is to produce 45° out-of-phase. The first duty cycle may be adjusted, for example, from 25 percent to 65 percent, to produce various offset $\theta$ angles of phase. The second duty cycle generator always yields an exactly 90° phase shift.

The instrument of the present invention presents various advantages. It operates over a frequency range, for example, of 50—5000 Hz., without the need to tune or adjust to a particular frequency. In addition, the demodulator does not employ a transformer and so eliminates phase errors which may be introduced by a transformer and permits operation at very low frequencies.

The outputs, which are selectable by a switch, are (1) a component in phase with the reference signal, (2) a component in quadrature (90°) with respect to the reference signal, (3) a component in phase with the reference signal $+\theta$, where $\theta$ is selectable, or (4) a component which is quadrature with respect to the reference signal $+\theta$, where $\theta$ is selectable. The shift of $\theta$ is selected by a dial and may, for example, be $\pm 25°$ or more.

I claim:

1. An instrument for the production of a phase shifted signal, the instrument including:
   an input terminal for an input signal of a repetitive wave;
   a duty cycle generator subcircuit connected to said input terminal, including means to produce a signal whose duty cycle is adjustable in periods, and independent of frequency changes;
   a bistable triggerable subcircuit connected to said duty cycle generator network; and
   a demodulator connected to said bistable subcircuit and connected with a phase shifted input signal, said demodulator producing a phase shifted output signal.

2. An instrument as in claim 1 wherein a square wave generator is connected between said input terminal and said duty cycle generator subcircuit to provide two complementary out-of-phase square waves at the same frequency as the input signal and is connected to the bistable triggerable subcircuit to synchronize said circuit with the square waves.

3. An instrument as in claim 1 wherein the said bistable circuit is connected to a second duty cycle generator network including means to produce a signal whose duty cycle is adjustable in its period, and independent of frequency and a second triggerable bistable subcircuit connected to said second duty cycle generator to provide a predetermined additional phase shift in the output signal.

4. An instrument as in claim 2 wherein the duty cycle generator subcircuit includes a monostable multivibrator in a closed loop system, said closed loop system arranged to provide a constant duty cycle over a wide range of input frequencies.